(12) United States Patent
Poma et al.

(10) Patent No.: US 8,820,721 B1
(45) Date of Patent: Sep. 2, 2014

(54) GLASS RAILING ANCHOR SYSTEM

(71) Applicants: Frank Poma, Port St. Lucie, FL (US); Jason Poma, Port St. Lucie, FL (US); Justin Poma, Port St. Lucie, FL (US)

(72) Inventors: Frank Poma, Port St. Lucie, FL (US); Jason Poma, Port St. Lucie, FL (US); Justin Poma, Port St. Lucie, FL (US)

(73) Assignee: Poma & Sons, Inc., Palm City, FL (US)

(\*) Notice: Subject to any disclaimer, the term of this patent is extended or adjusted under 35 U.S.C. 154(b) by 0 days.

(21) Appl. No.: 13/773,861

(22) Filed: Feb. 22, 2013

Related U.S. Application Data

(60) Provisional application No. 61/602,662, filed on Feb. 24, 2012.

(51) Int. Cl.
*E04H 17/16* (2006.01)
(52) U.S. Cl.
CPC ....................................... *E04H 17/16* (2013.01)
USPC ......................................... 256/24; 256/65.14
(58) Field of Classification Search
CPC .............. E04H 12/2223; E04H 12/223; E04H 12/2276; E04B 2002/749; E04F 11/1853; E04F 11/1812

USPC ............ 256/24, 25, 65.14; 403/259; 52/126.4
See application file for complete search history.

(56) References Cited

U.S. PATENT DOCUMENTS

| 4,390,165 | A | * | 6/1983 | Murdock | 256/24 |
| 4,391,069 | A | * | 7/1983 | Vermillion | 52/126.4 |
| 7,814,711 | B2 | * | 10/2010 | Milligan et al. | 52/126.4 |
| 2012/0043034 | A1 | * | 2/2012 | Feigl | 160/368.1 |

\* cited by examiner

*Primary Examiner* — Joshua Kennedy
(74) *Attorney, Agent, or Firm* — Malin Haley DiMaggio & Bowen, P.A.

(57) ABSTRACT

An improved glass railing anchor system for multiple glass panels in high-rise buildings which can experience hurricane strength winds, and which includes an elongated base member having two hollow wall sections which create a channel for receiving the glass panels. Aligned with and beneath the hollow wall sections are integral keyways which receive T-shaped anchors that also elevate the base member to allow for drainage. The anchors are slidable and can be selectively positioned for easy and secure installation. The base member, hollow wall sections, keyway and drainage areas can be integrally incorporated into a unitary device.

16 Claims, 8 Drawing Sheets

GLASS RAILING ANCHOR SYSTEM

CROSS REFERENCE TO RELATED APPLICATIONS

This application claims the benefit of U.S. Provisional Application No. 61/602,662 filed on Feb. 24, 2012.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to an anchor system for glass railings, and more particularly, to a glass railing anchor system that uses two rows of adjustable anchor bolts along a glass railing anchor that are staggered along a two lines to distribute tensile and compressive loads on the anchor and anchor bolts allowing use of the glass railing anchor system in high velocity wind zones, such as high velocity hurricane zones ("HVHZ").

2. Description of the Background Art

Conventional glass railing anchor systems known in the background art comprise surface or side mounted systems. With reference to FIGS. 1-4, a typical background glass railing anchor system 1 is shown and comprises a glass panel 2 supported in a bottom shoe base 3. The bottom shoe base 3 comprises a U-shaped base that is anchored to a concrete substrate by a plurality of threaded rods or expansion anchors 4 that are anchored along a straight line throughout the length of the base 3. A glass setting block 5 sits in the bottom of the channel formed by the U-shaped base 3 for receiving and supporting the glass panel 2. A typical glass railing comprises a plurality of glass panels separated by a one inch (1.0") glass joint or post 9. The glass panel 2 is secured in the channel by a grouting or glazing agent 6 and, in some cases, further secured by a rubber gasket 7. Typical glass rail anchor systems known also include a top rail glass cap 8a or vinyl cap 8b. To improve the aesthetic appeal of the U-shaped base shoe 3, some systems decorate it with a cover.

There are many disadvantages with conventional glass railing anchor systems, such as surface and flush installation systems. A primary disadvantage with existing glass railing anchor systems is that they are not designed for high wind hurricane zones (HVHZ) or other areas susceptible to high winds. This is because they are not properly shimmed or reinforced and are susceptible to bending along the centerline, where half the anchor is in tension and the other half in compression. This weakness results because the anchors 4 used to secure the base 3 to the concrete substrate are installed along a center line making them subject to bending and stress along the center line.

Known systems are also unable to drain water off balconies and they make direct contact with concrete or are embedded in grout causing corrosion of the base and coating. In surface or side mounted installations, the base is typically aluminum and in direct contact with concrete causing corrosion of the aluminum and failure of coating. In flush mounted installations, the entire base is embedded in grout in order to minimize the appearance of the base. However, most grouts are highly alkaline causing corrosion of the aluminum and failure of coating. These known attachment methods also do not provide a permanent waterproof seal of the anchor base or drainage, which permits water intrusion directly into the center of the concrete defeating most waterproofing techniques and promoting corrosion. In addition, typical base dimensions provide insufficient use of materials, wherein the base is up to three times heavier than necessary and more difficult to install. Moreover, conventional U-shaped bases typically have tall profiles and square shoulders giving them an artificial appearance, making them more difficult to conceal and facilitating the potential retention of water.

Another issue with existing glass rail anchoring systems is that the expansion anchors or threaded rods used cannot be relocated to avoid interference with reinforcement steel in the concrete without drilling new holes at the site and affecting the integrity of the substrate. Holes drilled in the field compromise the integrity of the aluminum coating system due to the unfinished edge, which can cause warranties to be reduced in half because of the field modifications. The use of expansion anchors can also cause undesirable internal stress within the concrete, especially at the edge of the balcony and induce undesirable compressive loads. These internal stresses can cause the concrete to spall creating structural problems, raising life safety concerns and accelerating corrosion, along with other problems. Accordingly, typical anchor placement and size prohibit placement of the system close to the balcony edge, if it can be used at all.

Conventional glass railing anchor systems have several other disadvantages. Traditional post mounted glass railing systems utilize posts and top caps, which obstruct the view through the glass. Glass railing anchor systems currently known rely on shims for leveling and supporting the system as they are not adjustable. The use of shims for leveling is cumbersome and creates an unsightly joint that must be covered to conceal the shims and joint. Most base mounted systems also rely upon a rubber gasket material for the retention of glazing. As a result, glass bears upon the rubber rather than structural grout reducing its bearing capacity. In addition, larger base shoes must be used in conventional systems to support glass because of inherent bearing capacity deficiencies.

Given the foregoing shortcomings in conventional glass railing anchor systems, there exists a need for a glass railing anchor system that is stronger to withstand the stresses, strains and compression realized in HVHZ and other high wind conditions; waterproof; adapted for installation in concrete along the edges without inducing undesirable compression loads; adapted for providing drainage to alleviate or eliminate corrosion from water accumulation and contact with concrete; designed to require less material; lighter; more aesthetically pleasing; adjustable; designed to not require pre-drilling of the base or drilling on location; and less costly. As there are no known devices or systems that provide a glass railing anchor system that adequately or effectively address these issues, there exists a need for such a device and system. It is, therefore, to the effective resolution of the aforementioned problems and shortcomings of the prior art that the present invention is directed. The instant invention addresses this unfulfilled need in the prior art by providing a glass railing anchor system as contemplated by the instant invention disclosed herein.

DETAILED DESCRIPTION OF THE INVENTION

Figure 1:
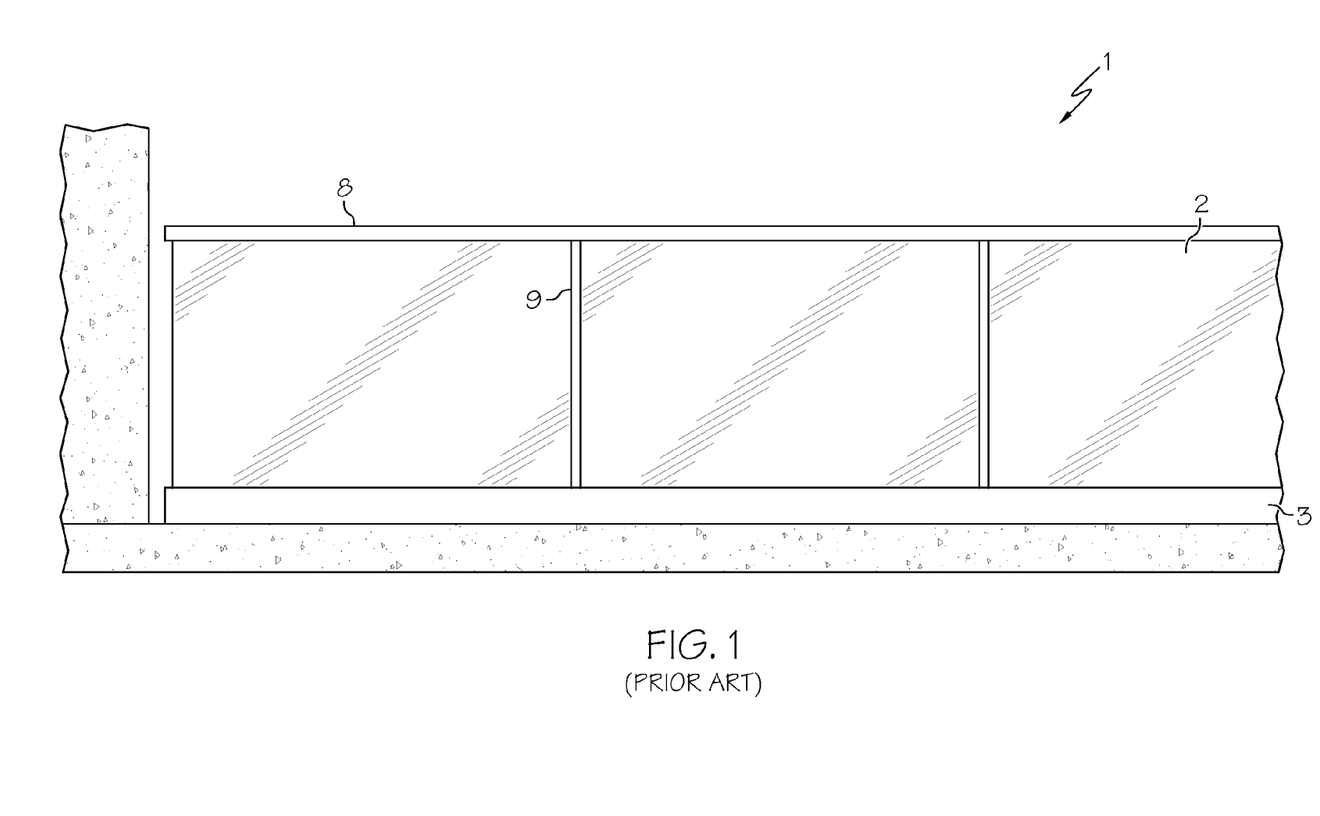
FIG. 1 is a front elevational view of a glass railing system known in the prior art.
Figure 2:
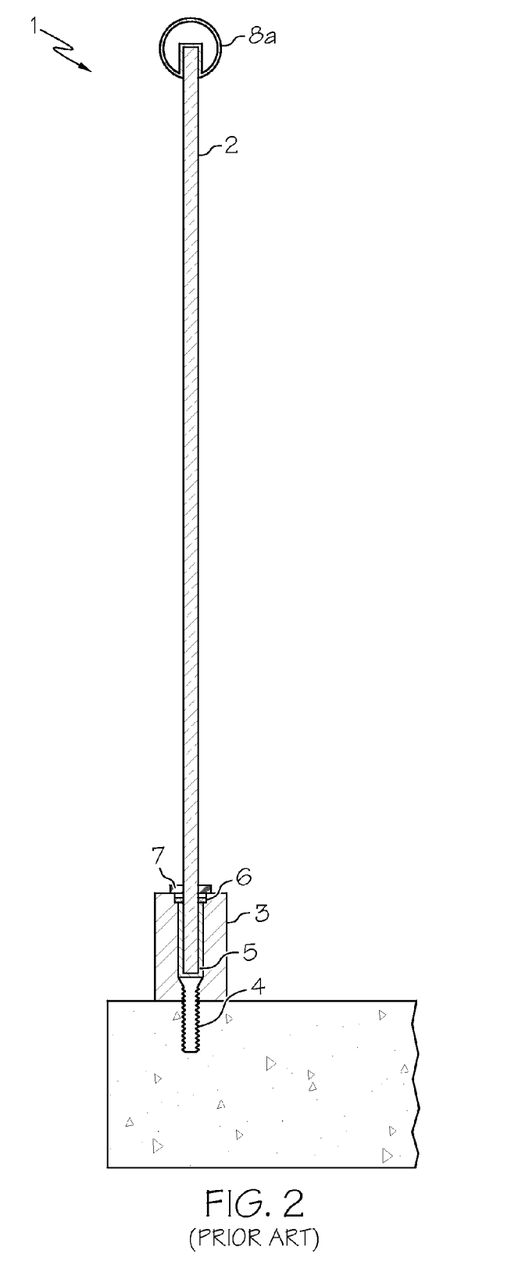
FIG. 2 is an elevational view from one end of the glass railing system known in the prior art.
Figure 3:
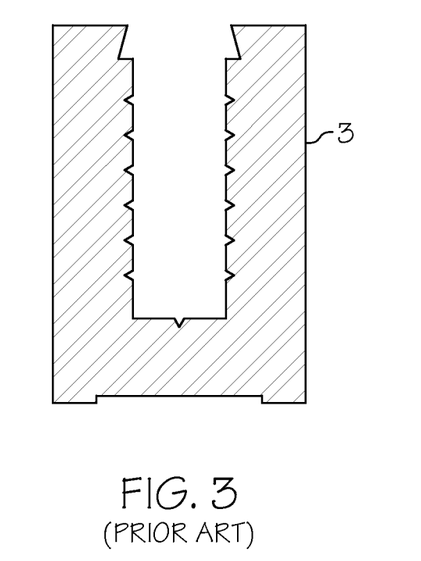
FIG. 3 is a side cross sectional view of a U-shaped shoe base known in the prior art.
Figure 4A:
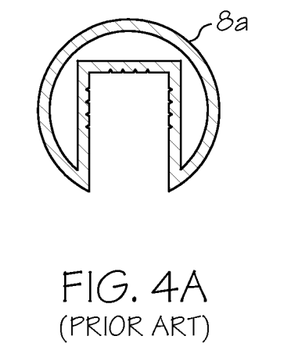
FIGS. 4A and 4B are side cross sectional views of top rail glass caps known in the prior art.
Figure 4B:
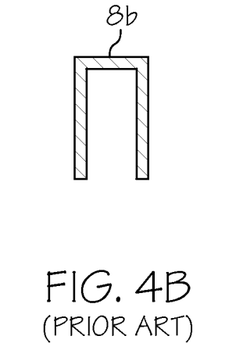
Figure 5:
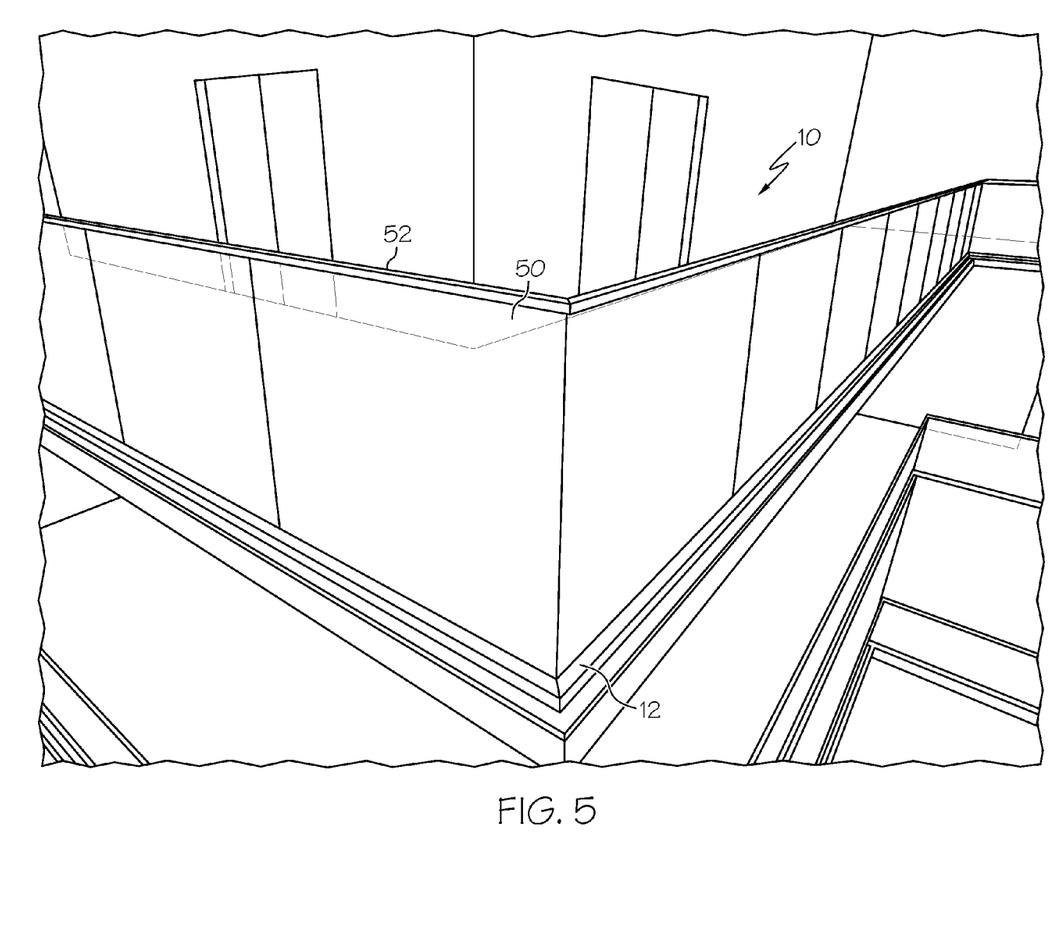
FIG. 5 is a perspective view of the glass railing system installed on a balcony in accordance with the preferred embodiment of the instant invention.

With reference to the drawings, FIGS. 5-10D depict the preferred and alternative embodiments of the instant invention which is generally referenced as a glass railing anchor system and, or by numeric character 10. The instant invention 10 comprises a glass railing anchor system that is designed to withstand the forces realized in high velocity hurricane zones ("HVHZ") and comparable high wind zones. The glass railing anchor system 10 is adapted for installation on balconies of high rises, as shown in FIG. 5. The instant invention 10 may also be installed on balconies of buildings in high wind zones, such as on the beach or on decks. Referring to FIG. 5, the glass railing anchor system 10 generally comprises an aluminum base 12 and at least one panel 50 supported by the base 12, and may also include a variety of caps 52. The instant invention 10 is described in more detail herein below.

Figure 6:
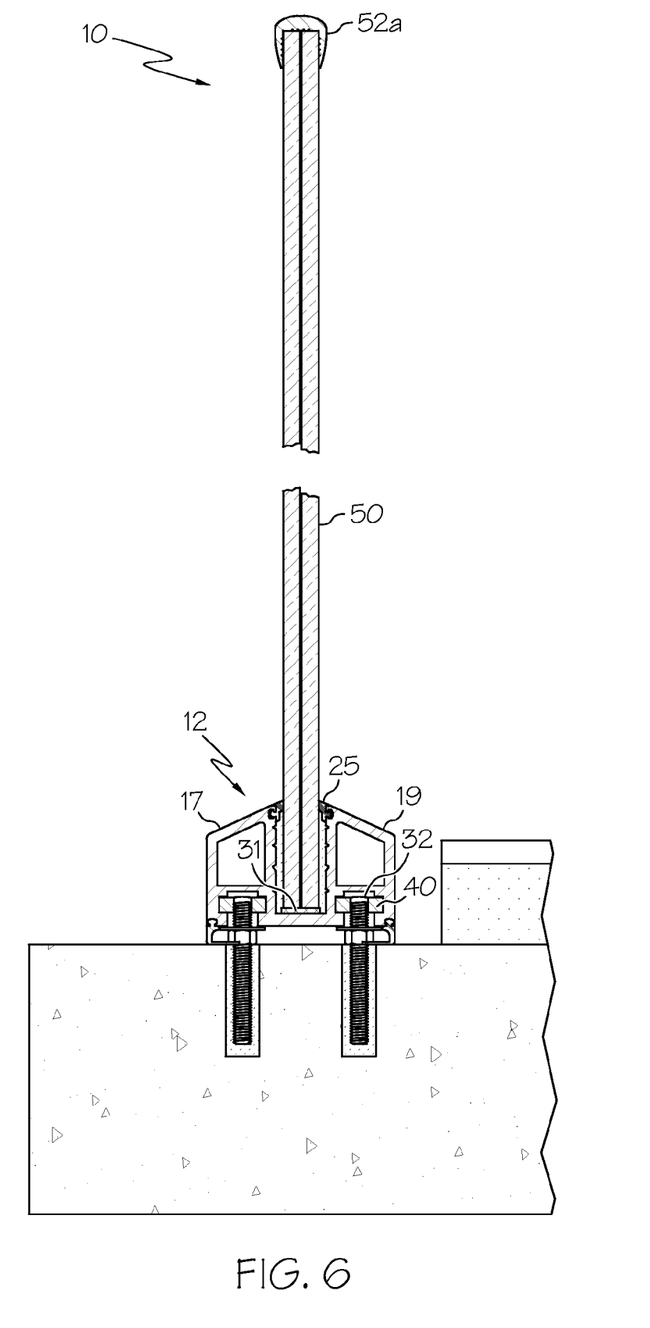
FIG. 6 is a cross sectional side view of the glass railing system as installed on a balcony in accordance with the preferred embodiment of the instant invention.

With reference to FIGS. 5 to 10D, the glass railing anchor system 10 comprises an elongated aluminum base 12 that is extruded to form two opposing, raised and parallel walls 16, 18 that define a glass panel receiving channel 20, gasket receiving channels 15, a gasket 70 for each side of a glass panel 50, a hollow channel 28, 30 in each wall, and a pair of slidable anchor receiving keyways 22, 32 in the base 12 below the walls 28, 30, on opposite sides of the base 12 for receiving and sliding T-bolt anchors 40. The instant invention 10 may also include skirt receiving channels 25, 27, a skirt 60 and, or at least one glass panel 50. The keyways 22, 32 comprise continuous slots that extend along the length of the base 12. The T-bolt anchors 40 uniformly distribute tension, compressive loads and rotational forces to meet specific wind loads realized along the base, glass panels and anchors. The glass railing anchor system 10 takes advantage of the tensile strength of the anchors 40 by staggering and spacing them to provide multiple lines of resistance. The anchors 40 are typically spaced 16 inches apart. If one area of a building has higher wind loads, the spacing between the anchors 40 can be reduced in order to resist the higher wind loads. The anchor 40 spacing may be adjusted to prevent contact with reinforcing bars in the concrete substrate, which avoids damage to the bars. The T-bolt anchors 40 can also adjust the height of the base 12 to eliminate contact with the concrete to prevent corrosion from alkali and water accumulation by defining a continuous space under the base 12 for positive water drainage so as to not allow water to pond between the aluminum base 12 and concrete. The T-bolt anchors 40 are set in high strength epoxy 25, as shown in FIG. 6, which provides for a water proof anchor point and eliminates the stresses that traditionally used expansion anchors create. The T-bolt anchors 40 are also strategically placed so they are not visible from normal view.

Figure 7:
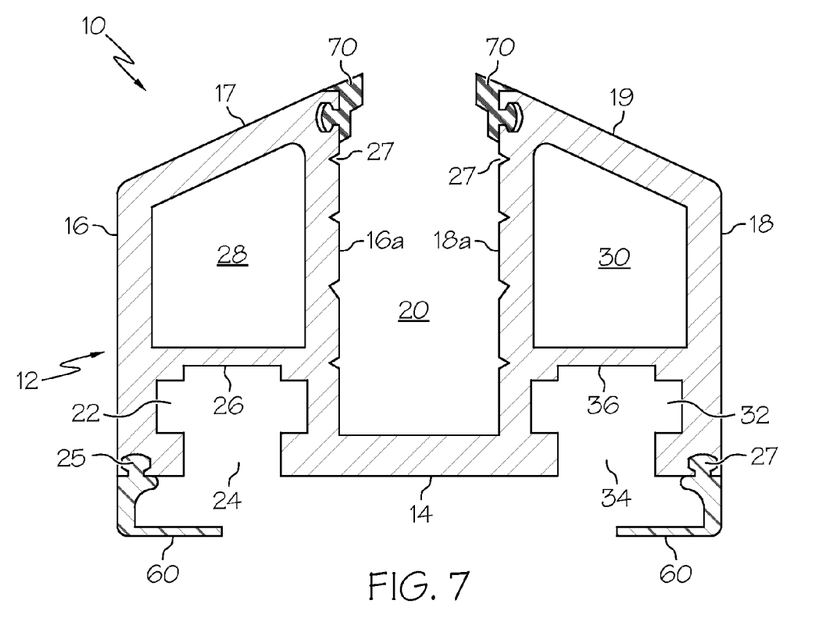
FIG. 7 is a cross sectional side view of the glass railing base in accordance with the preferred embodiment of the instant invention.
Figure 8:
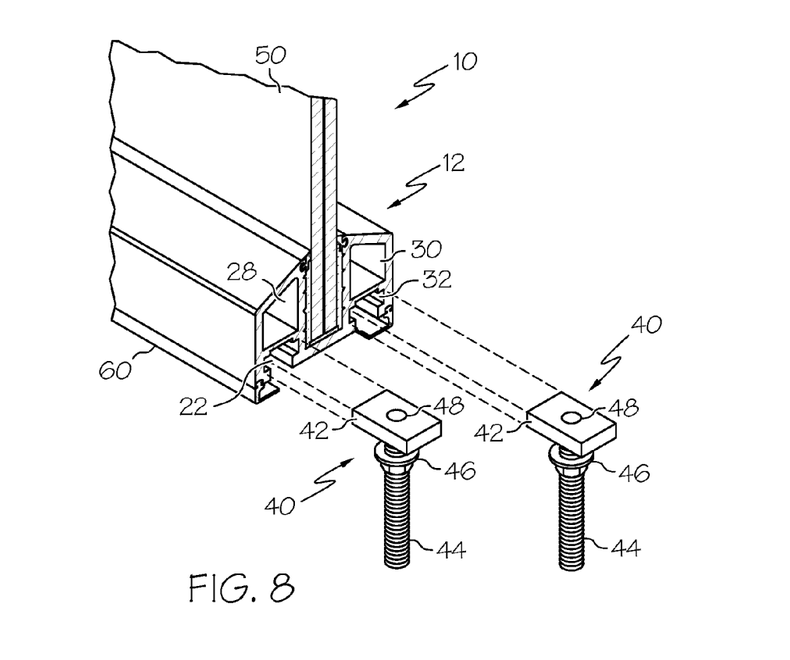
FIG. 8 is an exploded perspective view of the glass railing system showing the installation using the sliding anchor bolt assemblies in accordance with the preferred embodiment of the instant invention.
Figure 9:
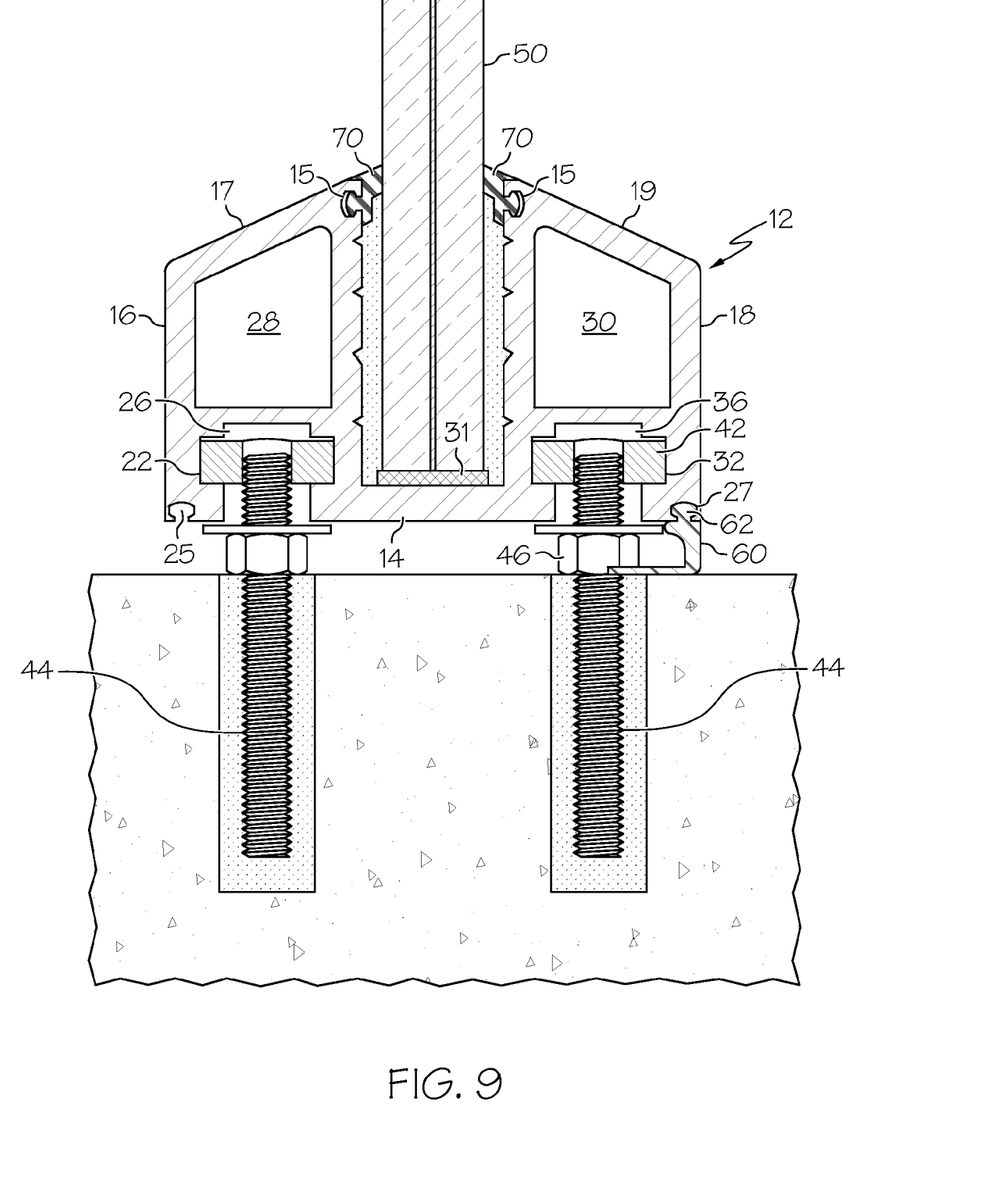
FIG. 9 is a cross sectional view of the glass railing system with a glass panel as installed in accordance with the preferred embodiment of the instant invention.

Still referring to FIGS. 5-10D, the elongated extruded base 12 defines the hollow walls 16, 18, the wall channels 28, 30, respectively, and the anchor keyways 22, 32. The hollow walls 16, 18 eliminate unnecessary weight making the base 12 easier to move, set and anchor. With reference to FIG. 9, the gasket channel 15 is defined in the interior surface 16a, 18a of the walls 16, 18, respectively, and extends continuously along the length of the walls 16, 18. The gasket channels 15 slidably receive and support a gasket 70 on each side of the base 12 to provide a decorative finished trim that hides the epoxy adhesive glazing set material. The gasket 70 preferably comprises a vinyl extruded material. The walls 16, 18 are separated and joined by a center base 14 which forms the floor of the glass panel receiving channel 20 and an inside section of the keyways 22, 32. The bottom surface of the base 12 below the walls 16, 18 may define skirt channels 25, 27, respectively, extending continuously along the length of the base 12 for supporting a skirt 60 on each side of the base 12, as shown in FIG. 9. The skirt channels 25, 27 receive a flange 62 projecting from the upper side of the skirt 60 for a tongue-and-groove fit. The skirt 60 disguises unlevel slab conditions or surface depressions and enhances aesthetic appearance by hiding the base drainage space when installed. The base 12 is secured to a concrete substrate with the height adjustable anchors 40 that slide into the slots 22, 32, secure the base and allow for adjustment of railing height, positioning of the anchors 40 and leveling which obviates the need to use unsightly leveling shims. Each slot 22, 32 defines an opening 24, 34, respectively, for passing the threaded rods 44 of the anchors 40, as shown in FIGS. 6-9.

With reference to FIGS. 6 and 8 each T-bolt anchor 40 comprises an upper plate 42, a stainless steel threaded rod or bolt 44 depending from the plate 42, and a stainless steel T-nut spacer 46 adjustably threaded to the threaded rod 44 below the upper plate 42 and base 12 for adjusting the height of the base 12 and securing the base 12 once in position. The T-bolt assembly 40 preferably comprises a stainless steel (SS) upper plate 42, SS threaded rod 44 and SS T-nut 46 wherein the plate is preferably 5/16"×1"×1.75". The bolts 44 are secured and set in a high strength epoxy, such as Adhesive Technologies Ultra Bond 2100, and mixed with sand filler in holes drilled in the concrete substrate. These dimensions may vary without departing from the scope and spirit of the instant invention 10.

With reference to FIGS. 6, 7 and 9, the glass panels 50 are secured in the base channel 20. A setting block 31 may be inserted and set in the base channel 20 on the floor 14 of the channel 20. The interior walls of the base channel 20 include a plurality of bonding channels 27 along each side for enhancing the bonding between the channel walls 16a, 18a and bonding agent, such as high strength epoxy. Once a glass panel 50 is inserted and set in the channel 20, gaps between the panel 50 and inner walls 16a, 18a of the channel 20 are filled with a high strength epoxy, such as Adhesive Technologies Ultra-Bond 2100. In an alternative embodiment, the glass panels 50 may be secured in the base channel 20 by a tapered wedge fit. The glass panels 50 preferably comprise a ¾ inch clear lamented glass, such as Sentryglass by Dupont®. The thickness of the glass panels 50 and width of the base channel 20 may vary without departing from the scope and spirit of the instant invention 10.

Figure 10A:
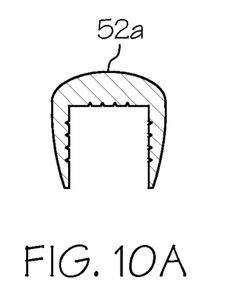
FIGS. 10A-10D are cross sectional views of various top caps of the glass railing system in accordance with the preferred embodiment of the instant invention.
Figure 10B:
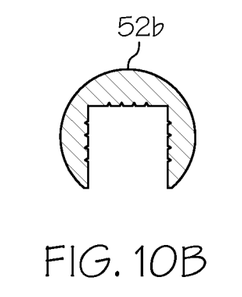
Figure 10C:
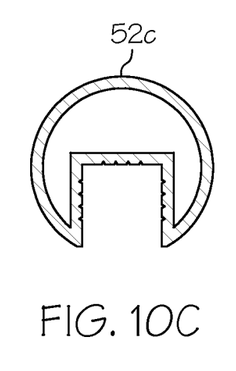
Figure 10D:
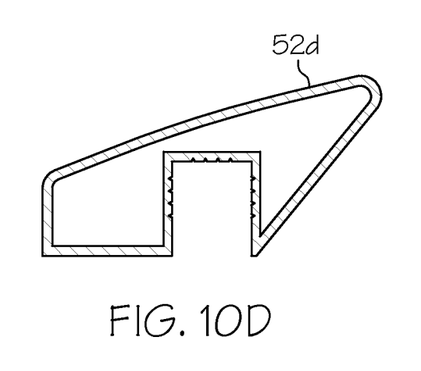

With reference to FIGS. 4, 6 and 10A-10D, the glass panels 50 may include decorative caps 52 snapped to the upper edge of the panels 50. Referring to FIGS. 9A-9D, the caps 52 comprise various shapes. Referring to FIG. 10A, the cap 52a comprises a horse shoe design preferably 1.225" high, 0.875" deep, 0.820" wide opening and 0.194" side wall thickness. Referring to FIG. 10B, the cap 52b comprises a low profile circular design preferably 1.25" high, 0.875" deep, 0.820" wide opening and 0.186" side wall thickness. Referring to FIG. 10C, the cap 52c comprises a high profile circular design preferably 1.788" high, 0.875" deep, 0.820" wide opening, 1.90" radius and 0.125" side wall thickness. Referring to FIG. 10D, the cap 52d comprises an oblong angular design preferably 1.875" high along the right angled side, 0.100" deep, 0.820" wide opening, 3.50" long along the top edge and 0.131" wall thickness. The shapes and dimensions of the caps 52 may vary without departing from the instant invention. The use of caps 52 is optional and mostly for aesthetic purposes but also provide protection to and from the top edge of the glass panels 50.

The instant invention 10 provides a wide base 12 with the opposing elongated keyways 22, 32 that accommodate two rows of anchors 40, which increase the resistance to shearing wind forces such as those in HVHZ's and the structural integrity of the base anchor 12. The slots 22, 32 also allow the anchors 40 to be moved which facilitates pre-coating and staggering, relocating and adjusting the anchor bolt assemblies 40 without requiring drilling in the field when an anchor 40 must be relocated to avoid contact with rebar in the concrete and allow closer placement to the concrete substrate's edges. The extruded design also reduces weight and offers flexibility in designing the base in various shapes and reduces costs in manufacturing. With reference to FIG. 7, the side walls 16, 18 comprise low profile angled top edges 17, 19, respectively, which may also comprise rounded edges, that makes the glass panels 50 appear to float while facilitating water runoff. The design of the glass railing anchor system 10 facilitates the placement of the anchors in epoxy and closer to the edges of the concrete substrate without inducing undesirable compressive loads within the concrete to maintain their tensile pullout strength and prevent the fracturing and spalling of the concrete. The use of epoxy also serves to waterproof newly drilled holes and prevents water intrusion into the center of the slab. An additional advantage of the instant invention is that it does not require posts or caps that could obstruct the view through a glass railing and facilitates the use of glass having varying degrees of thickness.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A glass railing anchor system for securing a glass railing to a concrete substrate, comprising:
   at least one glass panel;
   an elongated base member, said base member having means for receiving said glass panel;
   said base member further including at least one hollow wall member;
   said base member further including at least one keyway for receiving means for anchoring said base member; and
   means for anchoring said base member, said means for anchoring said base member including at least one generally T-shaped bolt member, said bolt member slidably engaging said keyway for selectively positioning and securing said base member;
   said T-shaped bolt member including means for elevating said base member above said concrete substrate creating a continuous space there between to allow for drainage; and
   said T-shaped bolt member including a lower portion for being secured to said concrete substrate.

2. The apparatus of claim 1 wherein said base member includes two hollow wall members, said wall members opposing one another on opposite sides of said glass panel.

3. The apparatus of claim 2 wherein the interior surfaces of said wall members form a portion of said means for receiving said glass panel.

4. The apparatus of claim 3 wherein said means for receiving said glass panel constitutes a channel formed by said interior surfaces of said wall members and a center base therebetween joining said wall members.

5. The apparatus of claim 4, wherein said base member, said hollow wall members and said center base constitute a unitary structure.

6. The apparatus of claim 5, wherein said base member includes two keyways, one said keyway formed about the bottom of each said wall member and integrally associated therewith.

7. The apparatus of claim 1, wherein said means for elevating said base member constitutes an adjustable hardware spacer.

8. The apparatus of claim 1, wherein said keyway further includes means for drainage within said keyway.

9. The apparatus of claim 1, wherein said base member further includes means for receiving an aesthetic skirt about said base.

10. A glass railing anchor system for securing a glass railing to a concrete substrate, comprising:
    at least one glass panel;
    an elongated base member, said base member having an integral channel for receiving said glass panel;
    said base member further including at least one hollow wall member;
    said base member further including at least one keyway for receiving an anchor member; and
    at least one said anchor for securing said base member;
    said anchor including at least one generally T-shaped bolt member, said bolt member slidably engaging said keyway for selectively positioning and securing said base member;
    said T-shaped bolt member including means for elevating said base member above said concrete substrate creating a continuous space there between to allow for drainage; and
    said T-shaped bolt member including a lower portion for being secured to said concrete substrate.

11. The apparatus of claim 10, wherein said base member includes two hollow wall members, said wall members opposing one another on opposite sides of said glass panel.

12. The apparatus of claim 11, wherein said integral channel is formed by said two wall members and a center base therebetween joining said wall members.

13. The apparatus of claim 12, wherein said base member, said hollow wall members and said center base constitute a unitary structure.

14. The apparatus of claim 13, wherein said base member includes two keyways, one said keyway formed about the bottom of each said wall member and integrally associated therewith.

15. A glass railing anchor system for securing a glass railing to a concrete substrate, comprising:

at least one glass panel;

an elongated base member, said base member having an integral channel for receiving said glass panel;

said base member further including a plurality of hollow wall members, said wall members forming said integral channel;

said base member further including a plurality of keyways, one said keyway about the lower section of each said wall member for receiving a plurality of anchor members;

a plurality of anchor members for securing said base member;

said anchor members constituting generally T-shaped bolt members, said bolt members slidably engaging said keyway for selectively positioning and securing said base member;

said T-shaped bolt members including means for elevating said base member above said concrete substrate creating a continuous space there between to allow for drainage; and said T-shaped bolt member including a lower portion for being secured to said concrete substrate.

16. The apparatus of claim 15, wherein said base member and said hollow wall members constitute a unitary structure.

* * * * *